United States Patent
Lee et al.

(10) Patent No.: US 11,448,281 B2
(45) Date of Patent: Sep. 20, 2022

(54) SUPERSCATTERING OF PLATE BENDING WAVE

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 165 days.

(21) Appl. No.: 17/067,102

(22) Filed: Oct. 9, 2020

(65) Prior Publication Data

US 2022/0112931 A1 Apr. 14, 2022

(51) Int. Cl.
| | |
|---|---|
| *F16F 7/108* | (2006.01) |
| *F16F 7/116* | (2006.01) |
| *B62D 37/02* | (2006.01) |
| *B60R 13/08* | (2006.01) |
| *B62D 33/02* | (2006.01) |
| *B62D 25/20* | (2006.01) |

(52) U.S. Cl.
CPC ............. *F16F 7/108* (2013.01); *B62D 37/02* (2013.01); *F16F 7/116* (2013.01); *B60R 13/0838* (2013.01); *B62D 25/20* (2013.01); *B62D 33/02* (2013.01)

(58) Field of Classification Search
CPC ........... F16F 7/108; F16F 7/116; B62D 37/02; B62D 25/20; B62D 33/02; B60R 13/0838
See application file for complete search history.

(56) References Cited

U.S. PATENT DOCUMENTS

| | | |
|---|---|---|
| 2021/0010977 A1 | 1/2021 | Lee et al. |
| 2022/0051650 A1 * | 2/2022 | Lee ..................... G10K 11/162 |

FOREIGN PATENT DOCUMENTS

| | | | | |
|---|---|---|---|---|
| DE | 19755750 A1 * | 7/1999 | ......... | B60R 13/0838 |
| DE | 102005003994 A1 * | 8/2006 | ............. | B60R 13/08 |
| FR | 2823467 A1 * | 10/2002 | ............. | B32B 15/08 |
| KR | 20110106694 A * | 9/2011 | | |

OTHER PUBLICATIONS

Lee et al., "Directional Acoustic Superscattering by Coupled Resonators," Phys. Rev. Appl.,12, id. 054059, pp. 1-9, (2019).
Esandiari "Parametric study of helmholtz resonator performance and effect of poroacoustic material use in resonator design," Iowa State Univ. Masters Thesis, 78 pages, (2017).
(Continued)

*Primary Examiner* — Lori L Lyjak
(74) *Attorney, Agent, or Firm* — Christopher G. Darrow; Darrow Mustafa PC

(57) ABSTRACT

Devices for superscattering a plate bending wave include a solid plate, and a circular array of spring-mass resonators positioned on a surface of the plate. All resonators in the circular array have a resonance frequency that can be matched to a frequency of a target flexural wave. The circular array has a diameter that can further be matched to the wavelength of the target flexural wave. Scattering efficiencies can exceed several multiples of the theoretical limit.

20 Claims, 8 Drawing Sheets

(56) References Cited

OTHER PUBLICATIONS

Wang et al., "Superlensing effect for flexural waves on phononic thin plates composed by spring-mass resonators," AIP Adv., 9, id 085207, 5 pages, (2019).
Yang et al., "Acoustic superscatterer and its multilayer realization," Appl. Phys. A, 99, pp. 843-847 (2010).
Ruan et al., "Superscattering of Light from Subwavelength Nanostructures," Physical Review Letters 105, Jul. 2, 2010, 013901, pp. 1-4.
Qian et al., "Experimental Observation of Superscattering," Physical Review Letters 122, published Feb. 11, 2019, 063901, pp. 1-13.

* cited by examiner

SUPERSCATTERING OF PLATE BENDING WAVE

TECHNICAL FIELD

The present disclosure generally relates to structural acoustics and, more particularly, to devices for superscattering of plate bending waves.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Structural waves, acoustic waves propagating through solid structures, enable the presence of unwanted sound and vibration in many technologies. Plate bending waves, or flexural waves, which transversely flex a solid plate, are an important propagator of such vibrational energy—undesirable in many instances. In the example of automobiles, plate bending waves contribute to the propagation of vibrational energy from the engine and from road friction throughout a vehicle.

Acoustic wave scatterers can mitigate the effects of acoustic waves via diffusion, resulting in thermal dissipation with diminished, or less focused, vibrational effect. Superscatterers are structure that can scatter acoustic waves with an efficiency that exceeds the typical theoretical limit of wave scattering.

Accordingly, it would be desirable to provide a system for superscattering plate bending waves, to diminish their vibration effects in automobiles and other solid structures.

SUMMARY

This section provides a general summary of the disclosure, and is not a comprehensive disclosure of its full scope or all of its features.

In various aspects, the present teachings provide a device for superscattering a flexural wave. The device includes a plate, and a circular array of spring-mass resonators positioned on the plate. The array has N degrees of rotational symmetry about a center point, where N is the number of resonators in the array.

In other aspects, the present teachings provide a vehicle having a device for superscattering a flexural wave. The vehicle includes a structural plate of the vehicle, and a circular array of spring-mass resonators positioned on the plate. The array has N degrees of rotational symmetry about a center point, where N is the number of resonators in the array.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide structures for resonance-based superscattering of flexural waves. The disclosed structures provide scattering, at or near a resonance frequency, of waves propagating through a solid structure, with very high efficiency.

The superscattering structures of the present teachings provide circular arrays of spring-mass resonators positioned on a surface of a structure through which flexural waves propagate.

Figure 1A:
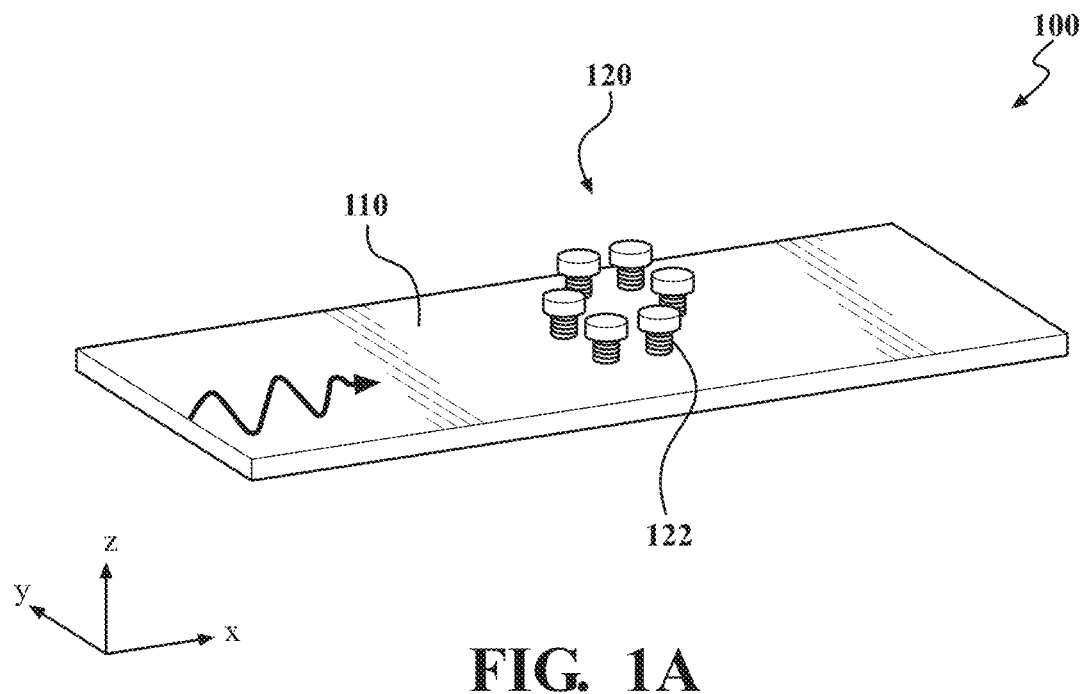
FIG. 1A is a perspective view of a device for superscattering a plate bending wave, the device having six resonators arrayed on a plate, the resonators positioned in a circular array defining a diameter.
Figure 1B:
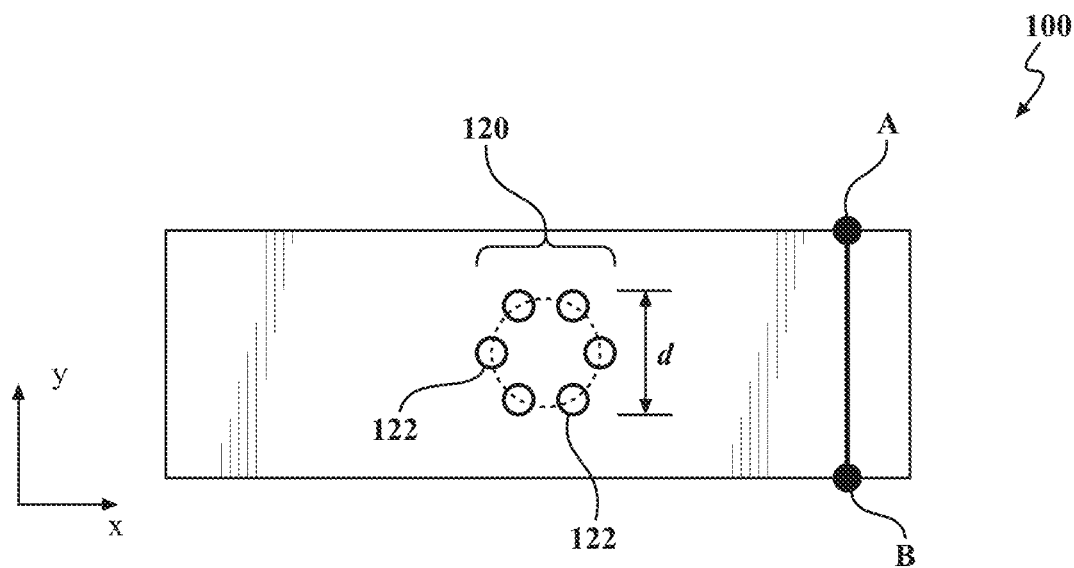
FIG. 1B is a top plan view of the device of FIG. 1A.

FIGS. 1A and 1B show a perspective view and a top plan view, respectively, of a superscattering device 100 having a sound conducting substrate that, for example purposes, is depicted as a solid, substantially planar plate 110. In one example, the plate can be 2 mm thick aluminum. The device 100 includes a polygonal shaped array 120 of resonators 122, positioned on one surface of the plate 110. In the example of FIG. 1A, six weighted spring resonators are positioned radially and symmetrically on one surface of the plate. In other words, they are positioned with rotational symmetry on the circumference of an imaginary circle such that the polygonal shaped array can be referred to herein as a circular array 120. In general, the circular array 120 can have N degrees of rotational symmetry about a center point, C, where N is the number of resonators in the array. The circular array 120 can generally include any number of radially positioned resonators 122 and, in some implementations, can have an even number of resonators 122. In some instances, the circular array 120 can have from two resonators 122 to eight resonators 122, inclusive. In certain implementations, the circular array 120 can have six radially positioned resonators.

Each resonator has a resonance frequency, $f_0$, as indicated by Equation 1:

$$f_0 = \frac{1}{2\pi}\sqrt{\frac{k}{m}}, \qquad 1$$

where k is the spring constant of the resilient member 124 and m is the mass of the weighted member 126. In certain examples presented below, the spring constant, k, is $2.0 \times 10^5$ N/m (Newtons per meter), and the mass, m, of the weight is 3.8 g, so that $f_0$ is about 1155 Hz.

The bending plate wavelength corresponding to a given frequency, f, is indicated by the Equation 2:

$$\lambda = 2\pi \sqrt[4]{\frac{D}{\rho t (2\pi f)^2}}, \qquad 2$$

where $\rho$ is the plate density, t is plate thickness, and D is plate bending stiffness, and f is the frequency of the flexural wave propagating through the plate. The plate bending stiffness, D, is further related to elastic modulus and Poisson's ratio as indicated by Equation 3:

$$D = \frac{Et^3}{12(1-v^2)}, \qquad 3$$

where E is plate elastic modulus, and v is Poisson's ratio of the material from which the plate 110 is formed. In certain implementations, the plate 110 can be formed of a metal, such as aluminum. In the case of aluminum, elastic modulus, E, and Poisson's ratio, v, 90 GPa and 0.33, respectively, yielding a plate bending stiffness of 52.37 N·m. Given plate density, p (2700 kg/m³ in the case of aluminum) and plate thickness, t (2 mm in certain examples discussed below), wavelength, $\lambda$, is readily calculated for any frequency.

With particular reference to FIG. 1A, it will be noted that the circular array 120 of resonators 122 defines a diameter, d. In certain implementations, the superscattering device 100 can be designed for optimal scattering of a target flexural wave of specified wavelength, $\lambda$. In such implementations, the resonance frequency, $f_0$, of one or more resonators 122 of the circular array 120 can be equal to the frequency, f, corresponding to the wavelength, $\lambda$, of the target flexural wave, as described in Equation 2. In some such implementations, the resonance frequency, $f_0$, of every resonator 122 in the circular array can be about equal to the frequency, f, corresponding to the wavelength of the target flexural wave. In some implementations, the diameter, d, defined by the circular array 120 of resonators 122 can be equal to about one-half of the wavelength, $\lambda$, of the target flexural wave. This wavelength can be referred to as the wavelength of a target flexural wave to be scattered. In some implementations, the wavelength of the target flexural wave can be a wavelength, $\lambda_0$, corresponding to the resonance frequency, $f_0$, of the individual resonators 122, via Equation 2.

The solid plate 110 can be characterized as having a minimum lateral dimension. The minimum lateral dimension can be defined as a minimum linear or curvilinear distance, along a surface of the plate 110, between opposite edges of the plate. In the example of FIG. 1B, the minimum lateral dimension is shown by the line connecting points A and B (large dots shown at points A and B for illustrative purposes). In some implementations, the minimum lateral dimension of the solid plate 110 can be at least six-times the diameter, d, defined by the circular array 120 of resonators 122.

Figure 1C:
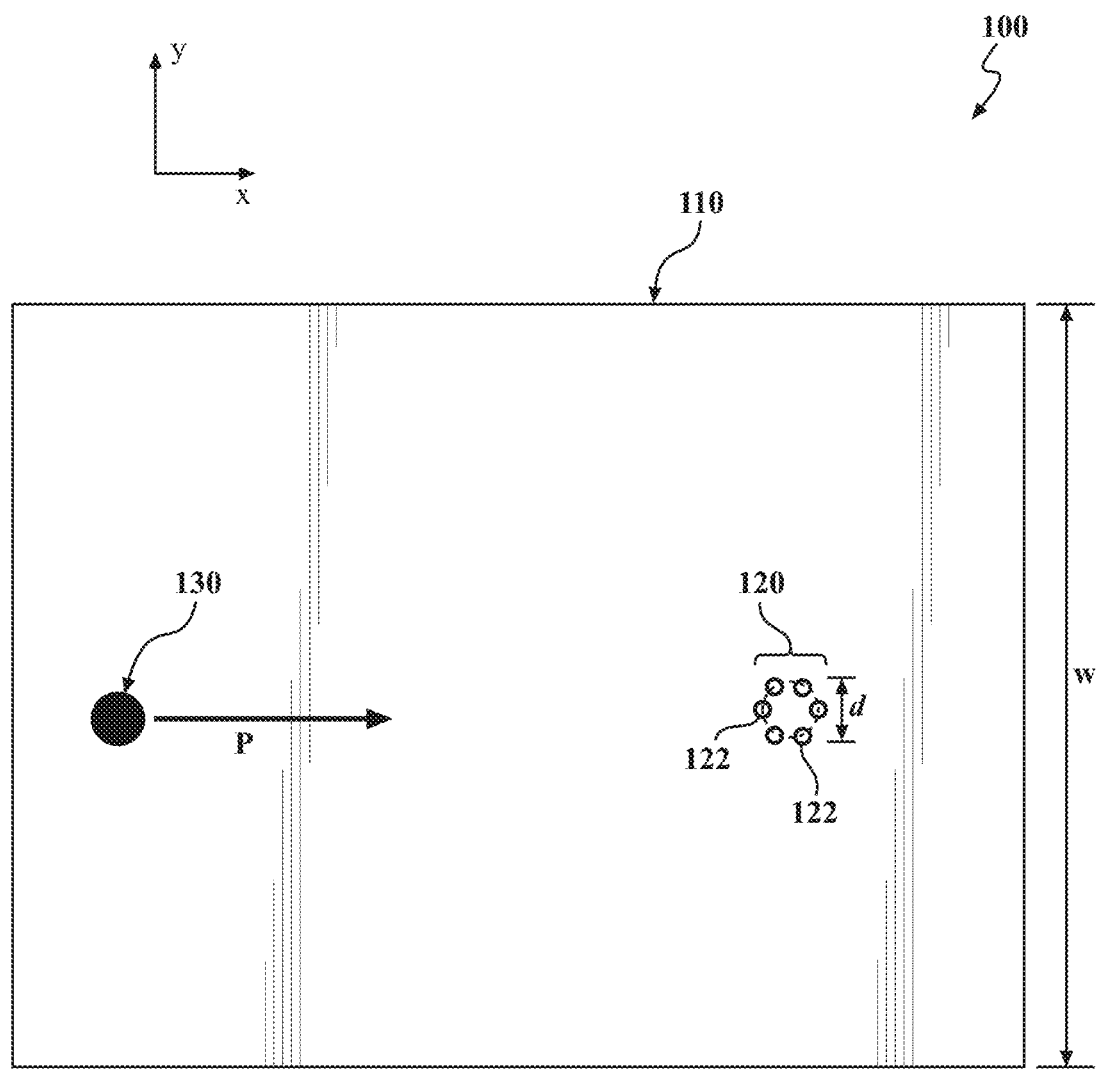
FIG. 1C is a top plan view of another implementation of the device of FIGS. 1A and 1B.

In some implementations, such as the example of FIG. 1C, the device 100 can include a flexural wave source 130, a mechanism or structure operable to generate a flexural wave on the plate 110, at a position defined by the flexural wave source 130. For example, the flexural wave source 130 could be a structure that strikes a surface of the plate 110, or any other structure or mechanism operable to generate a flexural wave in the plate 110. In many such implementations, a flexural wave generated by the flexural wave source 130 can be a target flexural wave having wavelength, l, which the circular array 120 of resonators 122 is configured to scatter with optimal efficiency.

A propagation direction, P, is defined by a direct path (e.g. a line) from the flexural wave source to the circular array 120 of resonators 122. The plate can be further characterized by a width, w; a distance between opposite edges of the plate 110 in a direction perpendicular to the propagation direction, P. It will be understood that the plate 110 need not necessarily be planar, but can be curved. In such variations, the width, w, can be characterized by the shortest curvilinear path between opposite edges of the plate 110, in a direction perpendicular to a curvilinear propagation direction, P. In instances where the width, w, is not uniform along the entire propagation direction, P, the width can be defined as the smallest width along the propagation direction, P. In some implementations, the width, w, can be at least six-times the diameter, d, defined by the circular array 120 of resonators 122. In some variations, the width, w, can be at least three-times the wavelength of a target flexural wave ($3\lambda$).

Figure 2A:
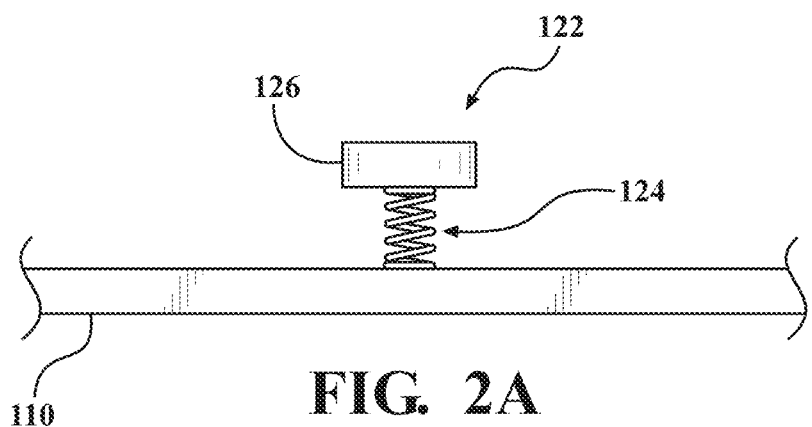
FIGS. 2A-2C are side plan views of three variations of a resonator of the device of FIGS. 1A and 1B.
Figure 2B:
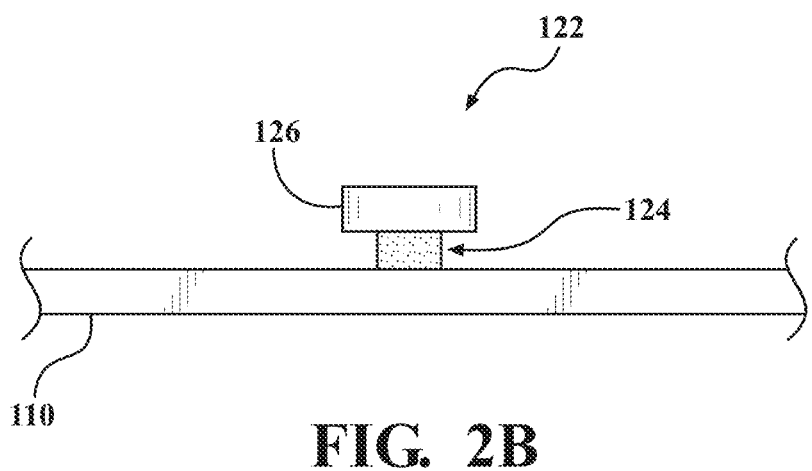
Figure 2C:
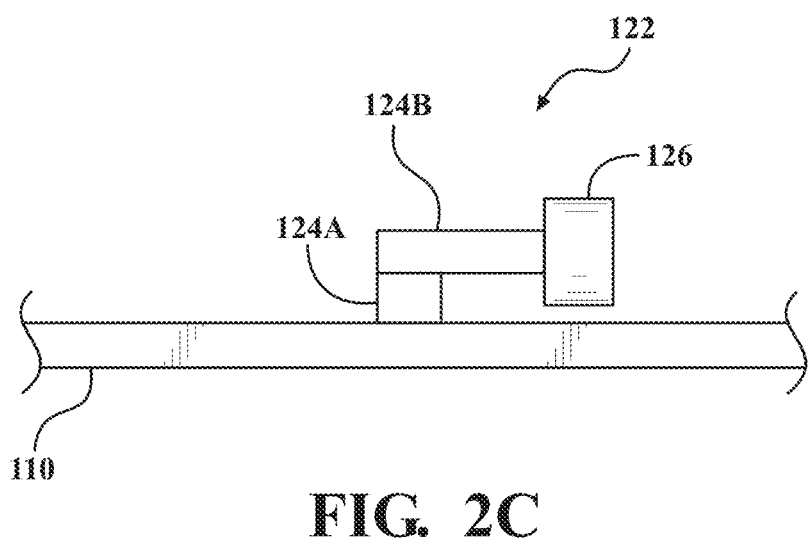

FIGS. 2A-2C show side plan views of different embodiments of a spring-mass resonator 122 mounted on a plate 110 that can be used with the device 100. All three embodiments have a resilient member 124, with a weighted member 126 at the distal end—the end opposite the plate 110. In the embodiment of FIG. 2A, the resilient member 124 is a spring component, such as a coiled spring. In the embodiment of FIG. 2B, the resilient member 124 is a piece of elastomeric material, such as natural or synthetic rubber, polyurethane, or silicone. In the example of FIG. 2C, the resilient member includes a base portion 124A attached to the plate 110 and formed of a rigid or semi-rigid material. An elongated oscillating portion 124B, substantially parallel to the plate 110 and formed of a less rigid elastic material, is attached to the base portion opposite the plate 110. The base portion 124A keeps the oscillating portion 124B off of the plate 110, while the oscillating portion 124B essentially acts as an elastic pendulum on which the weighted member 126 can oscillate.

Figure 3A:
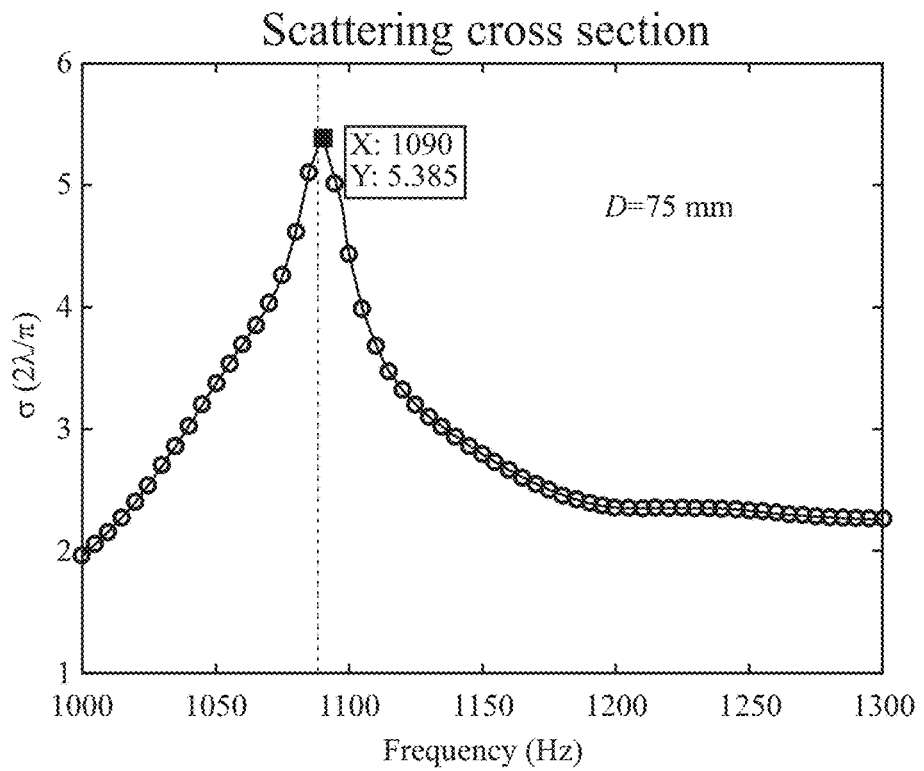
FIG. 3A is a scattering pattern diagram of the device of FIGS. 1A and 1B, with a diameter of 75 mm.
Figure 3B:
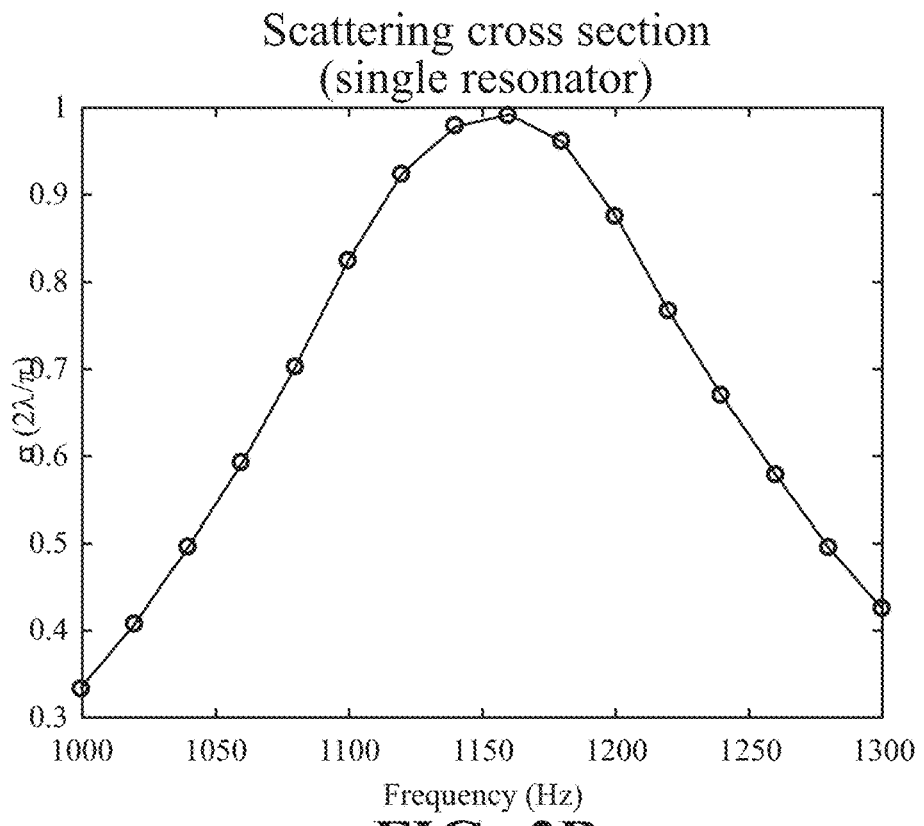
FIG. 3B is a plot of scattering cross section of a variant structure, comparable to that of FIGS. 1A and 1B but having only a single resonator.

FIG. 3A shows a plot of scattering cross section for a superscattering device 100 of the present teachings, having a diameter, d, of 75 mm. Units on the y-axis are multiples of the single channel scattering limit. FIG. 3B shows the scattering cross-section for a comparative scatterer having only a single resonator 122, as opposed to a circular array 120 of resonators 122. As expected, the single resonator device achieves only the predicted scattering cross-section limit of $2\lambda/\pi$, at about the resonance frequency. This result, particularly in comparison to the results of FIG. 3A, highlights the importance of the circular array 120 of resonators 122. In particular, the superscattering device 100 of FIG. 3A achieves scattering of over five-fold greater than that achieved by the comparative scatterer of FIG. 3B.

Figure 3C:
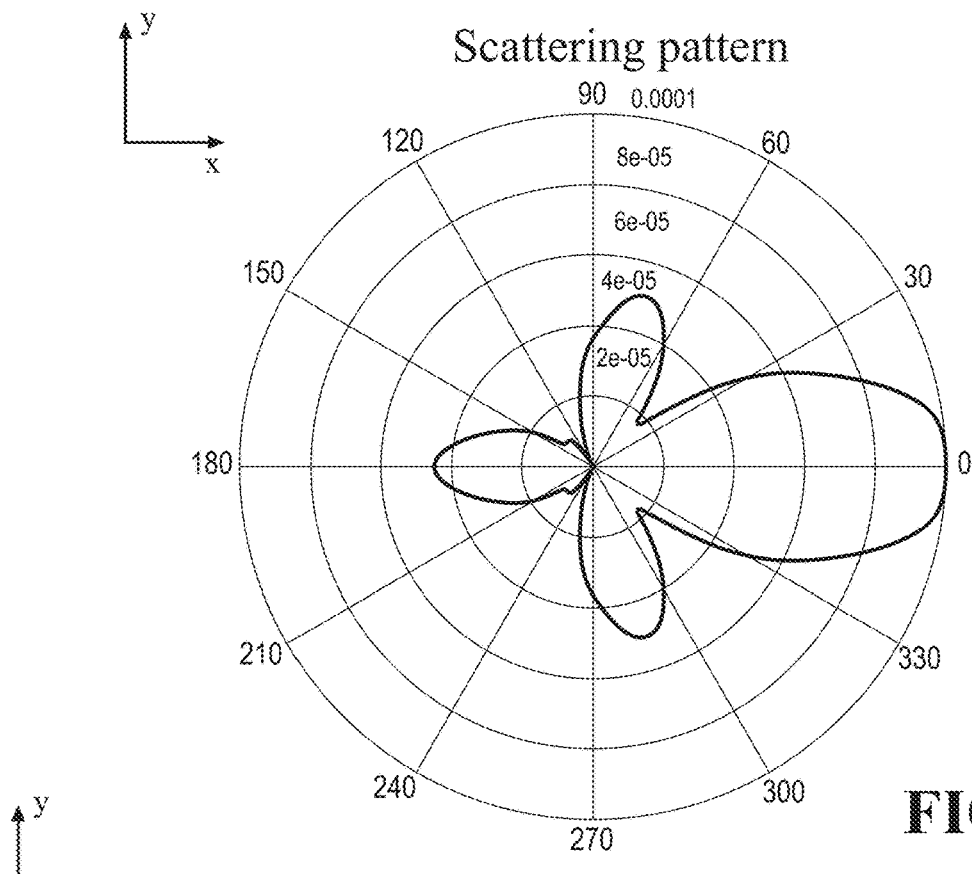
FIG. 3C is a is a flexural wave scattering pattern for the device of FIG. 3A.
Figure 3D:
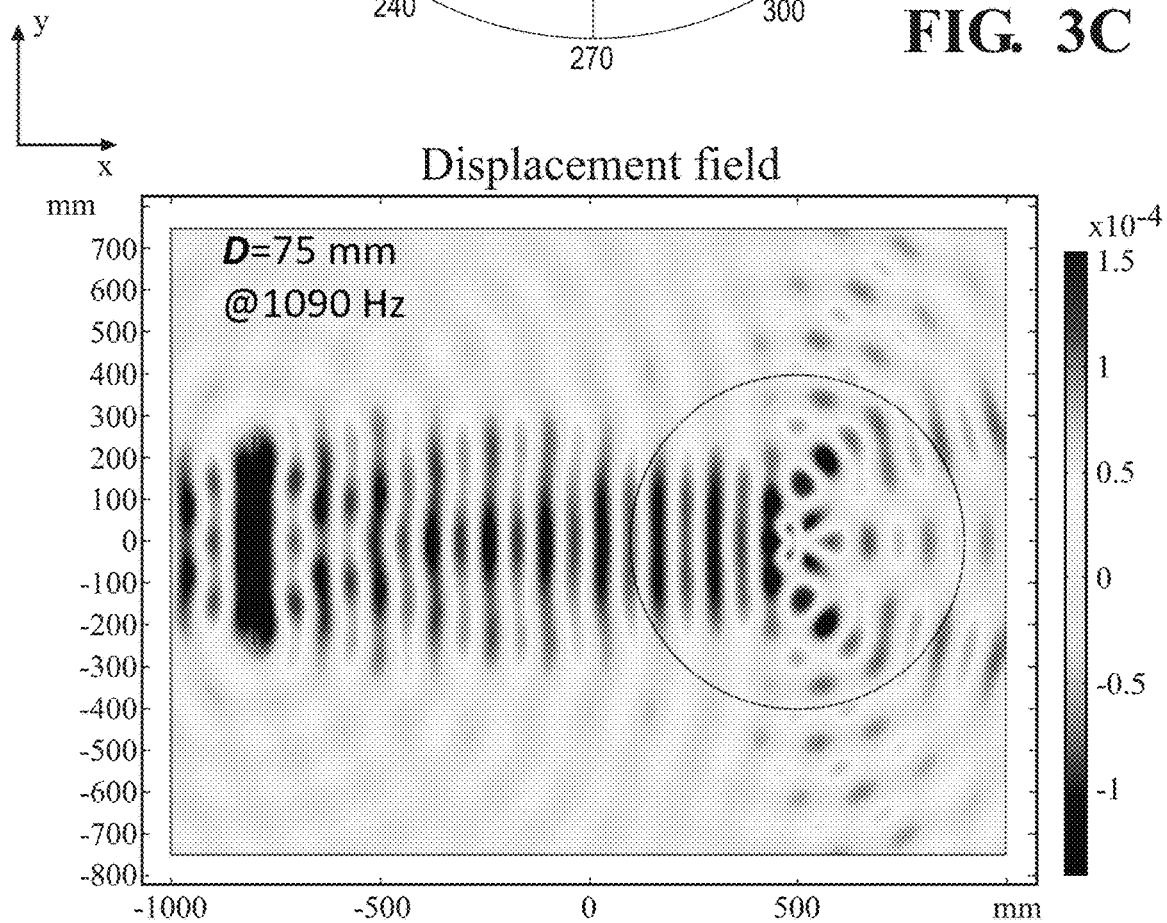
FIG. 3D is a plot of displacement field for the device of FIG. 3A.

FIG. 3C shows a scattering pattern, at 1090 Hz, for the device 100 of FIG. 3A. The magnitude scale (e.g. 2e-5, 4e-5, etc. corresponds to resonator displacement, in meters, at the given angle. It will be noted that in the labels of the magnitude scale, "e" means "power of ten". For example, "2e-5" means $2 \times 10^{-5}$, "4e-5" means $4 \times 10^{-5}$, and so forth. FIG. 3D shows a displacement field (sum of incident and scattered waves) corresponding to the scattering pattern of FIG. 3C. In FIG. 3C, at zero angle, a large scattering is observed. This enhanced scattering wave at zero angle destructively interferes with incident waves. As a result, in the total displacement field of FIG. 3D, the superscatterer forms a shadow region where waves are diminished.

Figure 4A:
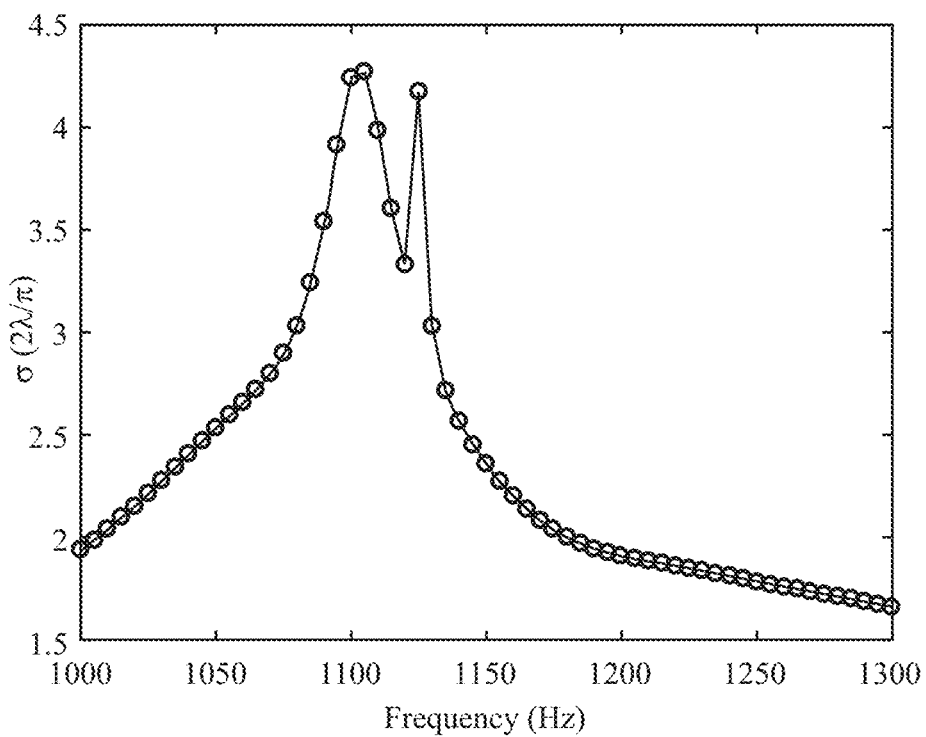
FIGS. 4A-4C are plots of scattering cross section for three different devices of the type shown in FIGS. 1A and 1B, and having diameters of 50 mm, 60 mm, and 70 mm, respectively.
Figure 4B:
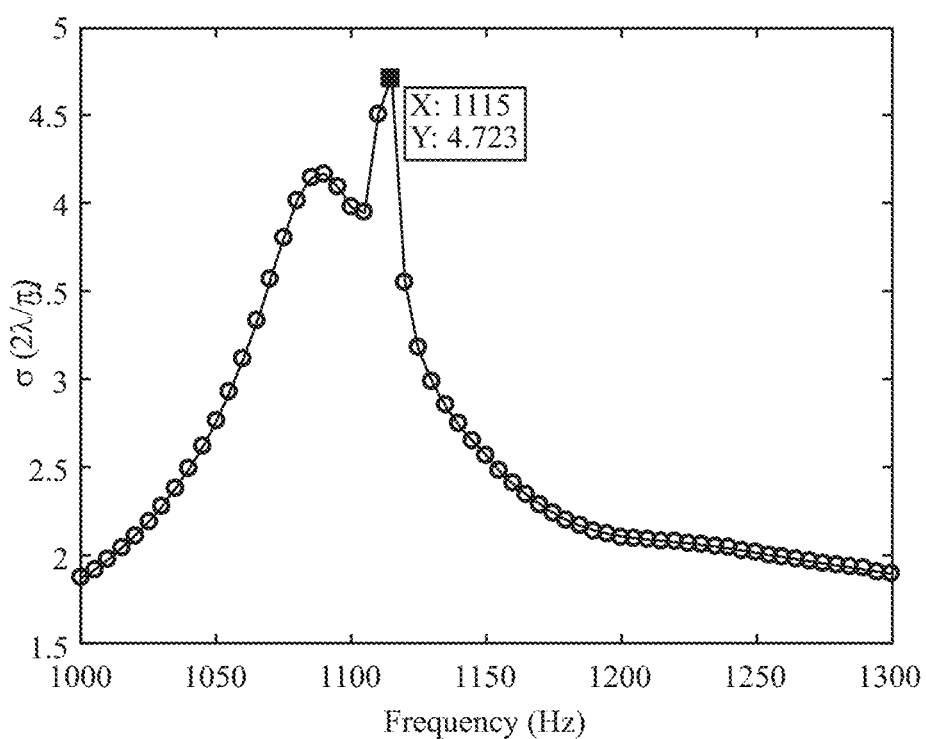
Figure 4C:
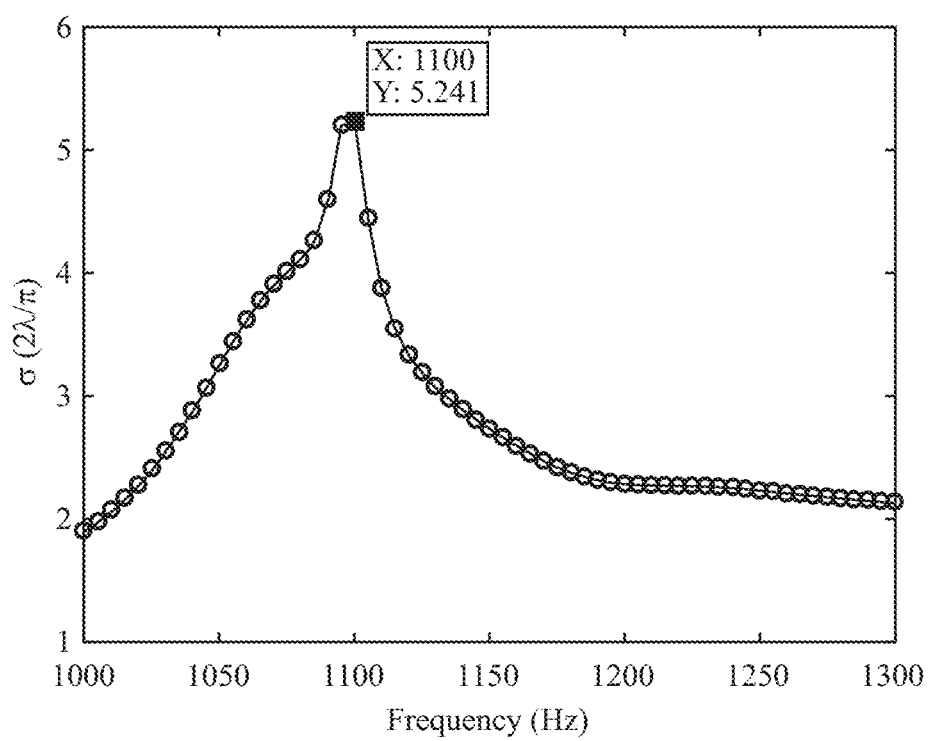

FIGS. 4A-4C show scattering cross-sections for other superscattering devices 100 of the present disclosure, but having different diameters, d, of the circular array 120 of resonators 122. The results show that the relationship between scatterer diameter and maximum scattering ($\sigma/\sigma_0$) can be summarized as:

d=50 mm; $\sigma/\sigma_0 \approx 4.3$
d=60 mm; $\sigma/\sigma_0 \approx 4.7$
d=70 mm; $\sigma/\sigma_0 \approx 5.2$
d=75 mm; $\sigma/\sigma_0 \approx 5.4$ As noted above, these data are obtained for a devices 100 with individual resonators 122 having a resonance frequency, $f_0$, of 1155 Hz. Using Equation 2, above, the resonance frequency corresponds to a wavelength, $\lambda_0$, in the 2 mm aluminum plate 110, of about 130.2 mm. It can thus be seen that increasing diameter, d, of the circular array 120 of resonators 122 results in an increase in the maximum observed scattering, at least up through $d \approx 0.58\lambda_0$.

It can further be observed that the wavelength at which maximum scattering is observed, $\lambda_{max}$, shifts slightly with changes in diameter, d. It is somewhat difficult to describe a pattern to these shifts, in part because of the lateral asymmetry of the scattering curves in FIGS. 3A and 4A-4C, but also because of the presence of an upfield scattering spike in the curves at d=50 or 60 mm (FIGS. 4A and 4B), particularly the latter where the upfield spike yields the maximum scattering. In particular, the wavelength of observed maximum scattering in relation to diameter of the circular array 120 is as follows:

d=50 mm; $\lambda_{max} \approx 133.1$ mm
d=60 mm; $\lambda_{max} \approx 134.3$ mm
d=70 mm; $\lambda_{max} \approx 133.4$ mm
d=75 mm; $\lambda_{max} \approx 134.0$ mm However, cursory visual examination of the wavelength at the geometric center of each of the curves in FIGS. 3A and 4A-4C appears to suggest that scattering is generally shifted to slightly lower frequency (greater wavelength) with increases in diameter of the array 120, at least up through $d \approx 0.58\lambda_0$. Thus, while the wavelength at which efficient scattering will occur is largely determined by the resonance frequency of the individual resonators 122, it can perhaps be slightly modulated by the diameter of the array 120.

Figure 5:
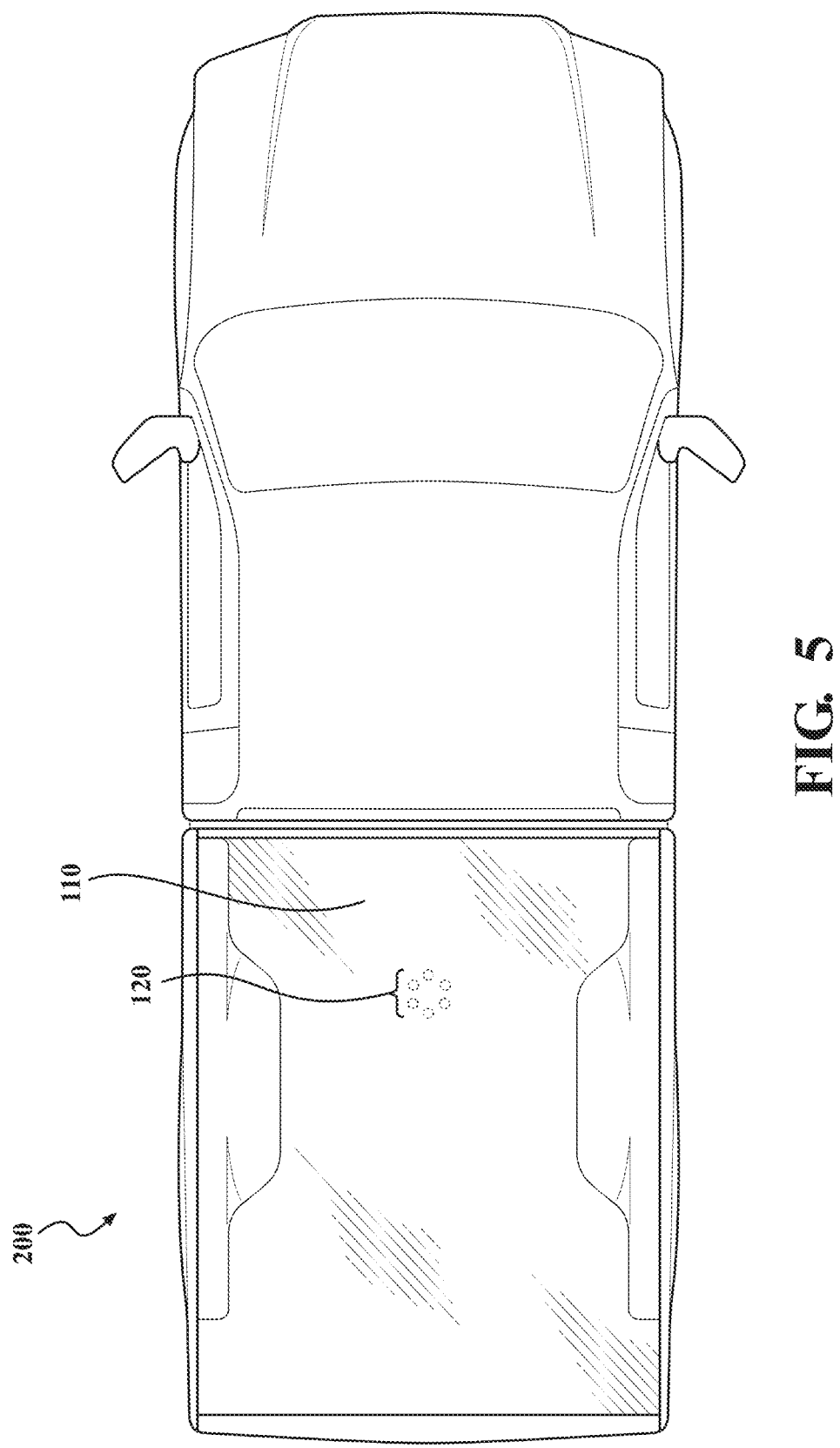
FIG. 5 is a partially transparent top plan view of a vehicle equipped with a flexural wave superscattering device.

Also disclosed is a motor vehicle having a device for superscattering a flexural wave. FIG. 5 shows a top plan view of such a vehicle 200. A circular array 120 of resonators, as described above, is positioned on a solid plate 110 of the vehicle 200. As described above, the solid plate 110 in the vehicle 200 can have a minimum lateral dimension equal to, or greater than, six times the diameter, d, defined by the circular array 120. In some implementations, the solid plate 110 in the vehicle can have a minimum lateral dimension of at least about 0.5 meters. In the example of FIG. 5, the solid plate 110 is in the bed of a truck, with the circular array 120 mounted to the underside of the truck bed. The solid plate on which the circular array is mounted could also be a cabin floorboard, the floor of an engine compartment, or any other solid plate 110 of sufficient lateral dimension, in which flexural wave scattering could be beneficial.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A device for superscattering a flexural wave, the device comprising:
   a plate; and
   a circular array of spring-mass resonators positioned on the plate, the array having N degrees of rotational symmetry about a center point, where N is the number of resonators in the array.

2. The device as recited in claim 1, wherein N is six.

3. The device as recited in claim 1, wherein the plate has a minimum lateral dimension that is equal to or greater than six-times a diameter defined by the circular array of spring-mass resonators.

4. The device as recited in claim 1, wherein each spring-mass resonator comprises:
   a spring portion connected to the plate and formed of a resilient element having a spring constant, k; and
   a mass portion supported by the spring portion and having a mass, m,
   wherein each spring-mass resonator has a resonance frequency, $f_0$, according to an equation:

$$f_0 = \frac{1}{2\pi}\sqrt{\frac{k}{m}},$$

and each spring-mass resonator of the plurality has substantially the same resonance frequency.

5. The device as recited in claim 4, wherein each resonator of the circular array has substantially the same spring constant, k, and mass, m.

6. The device as recited in claim 1, wherein each resonator of the circular array is substantially identical.

7. The device as recited in claim 1, comprising a flexural wave source positioned on the plate at a distance from the circular array, and operable to generate a target flexural wave having wavelength, λ, such that the target flexural wave propagates from the flexural wave source to the circular array, defining a propagation direction.

8. The device as recited in claim 7, wherein each resonator of the circular array has a resonance frequency, $f_0$, that corresponds to the wavelength, λ, of the target flexural wave by an equation:

$$\lambda = 2\pi\sqrt[4]{\frac{D}{\rho t(2\pi f_0)^2}},$$

wherein ρ is plate density, t is plate thickness, and D is plate bending stiffness.

9. The device as recited in claim 7, wherein the circular array defines a diameter, d, that is substantially equal to λ/2.

10. The device as recited in claim 7, wherein the plate has a width, w, perpendicular to the propagation direction, the width being greater than or equal to 3λ.

11. A vehicle having a device for superscattering a flexural wave, the vehicle comprising:
    a structural plate of the vehicle; and
    a circular array of spring-mass resonators positioned on the plate, the array having N degrees of rotational symmetry about a center point, where N is the number of resonators in the array.

12. The vehicle as recited in claim 11, wherein the structural plate is a floorboard.

13. The vehicle as recited in claim 11, wherein the structural plate is a floor of an engine compartment.

14. The vehicle as recited in claim 11, wherein the structural plate is a truck bed.

15. The vehicle as recited in claim 11, wherein N is six.

16. The vehicle as recited in claim 11, wherein the plate has a minimum lateral dimension that is equal to or greater than six-times a diameter defined by the circular array of spring-mass resonators.

17. The vehicle as recited in claim 11, wherein each spring-mass resonator comprises:
    a spring portion connected to the plate and formed of a resilient element having a spring constant, k; and
    a mass portion supported by the spring portion and having a mass, m,
    wherein each spring-mass resonator has a resonance frequency, $f_0$, according to an equation:

$$f_0 = \frac{1}{2\pi}\sqrt{\frac{k}{m}},$$

and each spring-mass resonator of the plurality has substantially the same resonance frequency.

18. The vehicle as recited in claim 17, wherein each resonator of the circular array has substantially the same spring constant, k, and mass, m.

19. The vehicle as recited in claim 11, wherein each resonator of the circular array is substantially identical.

20. The vehicle as recited in claim 11, comprising a flexural wave source positioned on the plate at a distance from the circular array, and operable to generate a target flexural wave having wavelength, λ, such that the target flexural wave propagates from the flexural wave source to the circular array, defining a propagation direction.

* * * * *

UNITED STATES PATENT AND TRADEMARK OFFICE
CERTIFICATE OF CORRECTION

PATENT NO. : 11,448,281 B2
APPLICATION NO. : 17/067102
DATED : September 20, 2022
INVENTOR(S) : Taehwa Lee and Hideo Iizuka Page 1 of 1

It is certified that error appears in the above-identified patent and that said Letters Patent is hereby corrected as shown below:

In the Specification

Column 3, Line 33: delete "and v is" and insert --and $v$ is--

Column 3, Line 37: delete "ratio, v, 90" and insert --ratio, $v$, 90--

Column 3, Line 39: delete "density, p" and insert --density, $\rho$--

In the Claims

Claim 7, Column 7, Line 38: delete "wavelength, A, such" and insert --wavelength, $\lambda$, such--

Signed and Sealed this
Twenty-fifth Day of October, 2022

Katherine Kelly Vidal
*Director of the United States Patent and Trademark Office*